United States Patent [19]
Davis

[11] Patent Number: 5,431,069
[45] Date of Patent: Jul. 11, 1995

[54] SHEET METAL EDGING FILES

[76] Inventor: David K. Davis, 3015B Hopkins Ct., Ft. Meade, Md. 20755

[21] Appl. No.: 219,436

[22] Filed: Mar. 29, 1994

[51] Int. Cl.$^6$ .............................................. B24B 3/54
[52] U.S. Cl. ......................................... 76/87; 76/86; 451/557
[58] Field of Search ..................... 76/87, 82, 85, 86; 51/205 R, 205 WG, 391, 392

[56] References Cited

U.S. PATENT DOCUMENTS

| | | | |
|---|---|---|---|
| 320,899 | 6/1885 | Tucker | 51/205 R |
| 1,055,739 | 3/1913 | Haas | 76/87 |
| 1,259,136 | 3/1918 | Rogers | 51/205 R |
| 1,851,012 | 3/1932 | Keil | 76/87 |
| 5,029,417 | 7/1991 | Keller | 76/86 |
| 5,040,435 | 8/1991 | Millman | 76/86 |

*Primary Examiner*—Hwei Siu Payer

[57] ABSTRACT

A sheet metal edging file comprises a frame with a base and two side arms which extend upwardly. The side arms are formed in a generally planar configuration with an inner surface, an outer surface, parallel short end edges and parallel long side edges. The side arms also have an upper region and a lower region, with one short side of each side arm being contiguous with the upper surface of the base. The upper region of each side arm also includes a centrally located aperture extending therethrough. The plane of the side arms are angled at an acute angle with respect to the axis of the base. Two file wheels are formed in a planar, generally circular configuration with a centrally located circular aperture extending therethrough. Each wheel has an inner surface and an outer surface and includes a plurality of blades on its inner surface. The blades extend radially outward from the central aperture to a location proximate to its outer edge. The wheels are positioned to oppose each other at an acute angle. Two axles are formed as long cylindrical members adapted to couple the file wheels to the frame through their respective centrally located circular apertures. A handle is formed in a generally cylindrical configuration with an upper section coupled to the frame and a lower section adapted to be gripped by a user.

4 Claims, 4 Drawing Sheets

SHEET METAL EDGING FILES

BACKGROUND OF THE INVENTION

1. Field of the Invention

The present invention relates to sheet metal edging files and more particularly pertains to filing and dulling sharp edges on sheet metal by repeatedly drawing the wheels of the tools along the sharp edges.

2. Description of the Prior Art

The use of deburring devices is known in the prior art. More specifically, deburring devices heretofore devised and utilized for the purpose of deburring and dulling sharp edges by scraping or milling the sharp edges are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,691,898 to Held, an edge burr removal apparatus.

U.S. Pat. No. 5,054,201 to Andrews discloses a double insert deburring tool.

U.S. Pat. No. 4,604,011 to Rungger et al. discloses a method and apparatus for edge-planning sheet metal.

U.S. Pat. No. 3,593,870 to Anderson discloses a closure for fluid container.

U.S. Pat. No. 4,648,762 to Hall et al. discloses an apparatus for preparing the edges of metal sheets to be welded.

Lastly, U.S. Pat. No. 3,517,712 to Selowitz discloses a workpiece edge trimming device.

In this respect, the sheet metal edging files according to the present invention substantially departs from the conventional concepts and designs of the prior art, and in doing so provides an apparatus primarily developed for the purpose of filing and dulling sharp edges on sheet metal by repeatedly drawing the wheels of the tools along the sharp edges.

Therefore, it can be appreciated that there exists a continuing need for new and improved sheet metal edging files which can be used for filing and dulling sharp edges on sheet metal by repeatedly drawing the wheels of the tools along the sharp edges. In this regard, the present invention substantially fulfills this need.

SUMMARY OF THE INVENTION

In view of the foregoing disadvantages inherent in the known types of deburring devices now present in the prior art, the present invention provides an improved sheet metal edging files. As such, the general purpose of the present invention, which will be described subsequently in greater detail, is to provide a new and improved sheet metal edging files and method which has all the advantages of the prior art and none of the disadvantages.

To attain this, the present invention essentially comprises a new and improved sheet metal edging file with a frame consisting of a base and two side arms. The base is formed in a planar, generally rectangular configuration with an upper surface, a lower surface, parallel short end edges and parallel long side edges. The base has upwardly extending side arms which emanate from the upper surface of the opposing short end edges. The side arms are formed in a planar, generally rectangular configuration with an inner surface, an outer surface, parallel short end edges and parallel long side edges. The side arms also have an upper region and a lower region. One short side of each side section is contiguous with the upper surface of the base. The opposing short side of each side arm defines the uppermost extent of the upper region and includes rounded corners. The upper region of each side arm also includes a centrally located aperture extending therethrough. The plane of the side arms are angled at between about twenty and forty degrees with respect to the axis of the base. Two file wheels are each formed in a planar generally circular configuration with a centrally located circular aperture extending therethrough. Each wheel has an inner surface and an outer surface. The central portion of each wheel has a thickness larger than the outer edges with a gradually decreasing thickness therebetween. Each wheel includes a plurality of long pyramidal configured blades on its inner surface which extend radially outward from the central aperture to a location proximate to its outer edge. The wheels are positioned to oppose each other at an angle of between about forty and sixty degrees when in the operative orientation. Two axles are each formed as long cylindrical members with a planar circular head at one end and external screw threads at the other end. The axles are adapted to couple the file wheels to the frame through their respective centrally located circular apertures, thereby allowing circular rotation of the wheels upon the axles. Two nuts with circular apertures have a plurality of internal screw threads cooperatively coupled with the axles to retain the file wheel thereupon. A handle is comprised of metal and formed in a generally cylindrical configuration with an upper section and a lower section. The lower section includes a circular aperture which extends through the handle near its lowermost extent. The lowermost extent of the lower section is formed in a rounded semi-spherical configuration. The upper segment includes a flat surface at its uppermost extent and is operatively coupled to the lower surface of the base of the frame. A handle cover is comprised of plastic and formed in a hollow, generally cylindrical configuration with one open end and one closed rounded end. The cover includes two opposing circular apertures near its rounded end. The cover is adapted to receive the handle through its open end with the circular apertures positioned in alignment with the circular apertures in the handle. The plastic cover is configured to fit securely around the handle to enhance gripping by the user.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved sheet metal edging files which have all the advantages of the prior art deburring devices and none of the disadvantages.

It is another object of the present invention to provide new and improved sheet metal edging files which may be easily and efficiently manufactured and marketed.

It is further object of the present invention to provide new and improved sheet metal edging files which are of durable and reliable constructions.

An even further object of the present invention is to provide new and improved sheet metal edging files which are susceptible of a low cost of manufacture with regard to both materials and labor, and which accordingly are then susceptible of low prices of sale to the consuming public, thereby making such sheet metal edging files economically available to the buying public.

Still yet another object of the present invention is to provide new and improved sheet metal edging files which provide in the apparatuses and methods of the prior art some of the advantages thereof, while simultaneously overcoming some of the disadvantages normally associated therewith.

Still another object of the present invention is to file and dull sharp edges on sheet metal by repeatedly drawing the wheels of the tools along the sharp edges.

Lastly, it is an object of the present invention to provide new and improved sheet metal edging files comprising a frame with a base and two side arms which extend upwardly. The side arms are formed in a generally planar configuration with an inner surface, an outer surface, parallel short end edges and parallel long side edges. The side arms also have an upper region and a lower region, with one short side of each side arm being contiguous with the upper surface of the base. The upper region of each side arm also includes a centrally located aperture extending therethrough. The plane of the side arms are angled at an acute angle with respect to the axis of the base. Two file wheels are formed in a planar, generally circular configuration with a centrally located circular aperture extending therethrough. Each wheel has an inner surface and an outer surface and includes a plurality of blades on its inner surface. The blades extend radially outward from the central aperture to a location proximate to its outer edge. The wheels are positioned to oppose each other at an acute angle. Two axles are formed as long cylindrical members adapted to couple the file wheels to the frame through their respective centrally located circular apertures. A handle is formed in a generally cylindrical configuration with an upper section coupled to the frame and a lower section adapted to be gripped by a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
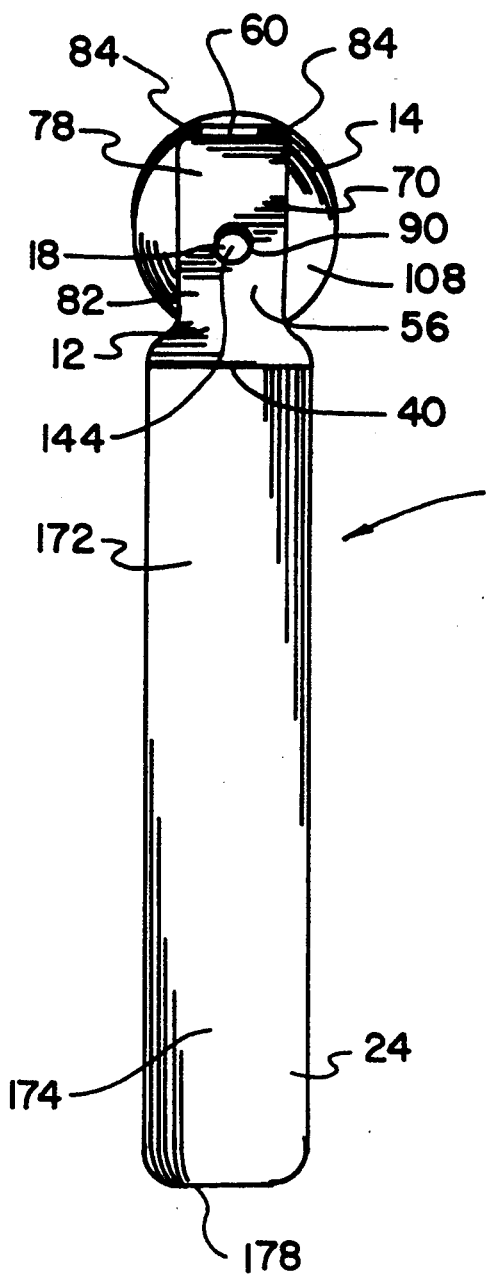
FIG. 1 is a perspective view of the preferred embodiment of the sheet metal edging files constructed in accordance with the principles of the present invention.
Figure 2:
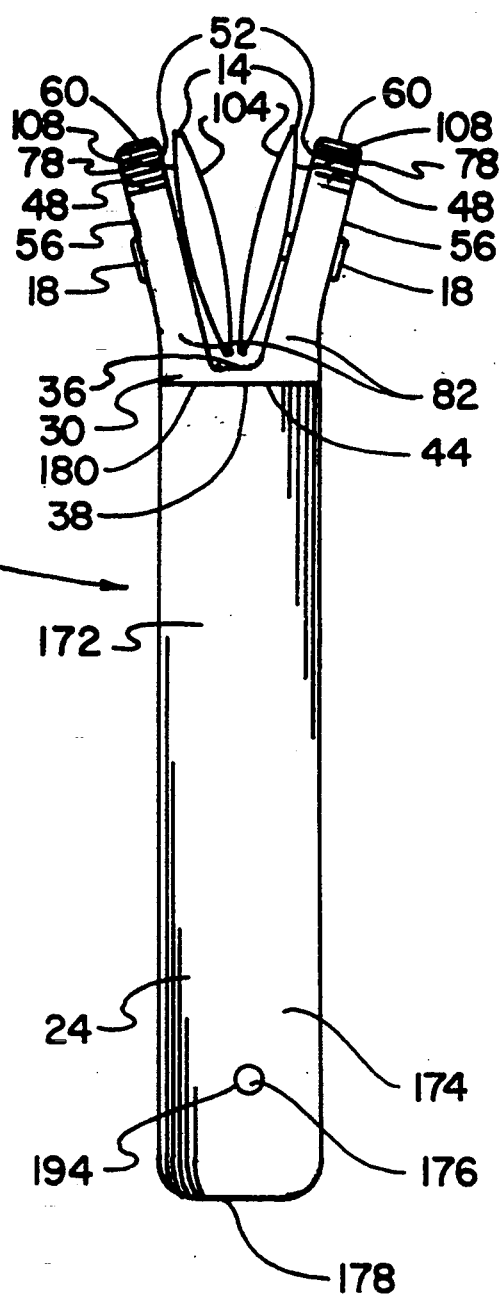
FIG. 2 is an additional perspective view of the sheet metal edging file taken from a different angle than FIG. 1.
Figure 4:
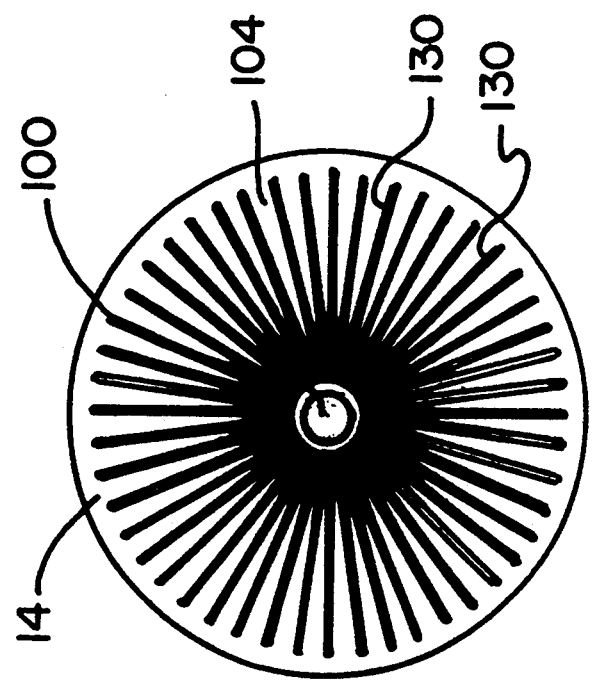
FIG. 4 is an elevational view of the inner surface of a file wheel.
Figure 3:
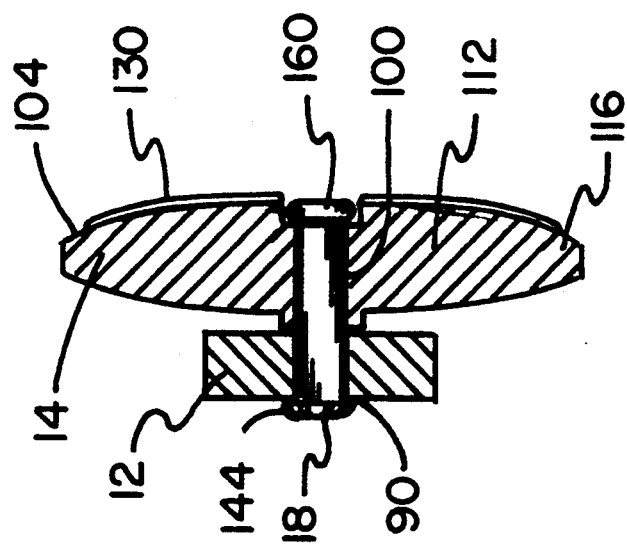
FIG. 3 is a cross sectional view of a file wheel and side arm of the apparatus.
Figure 3A:
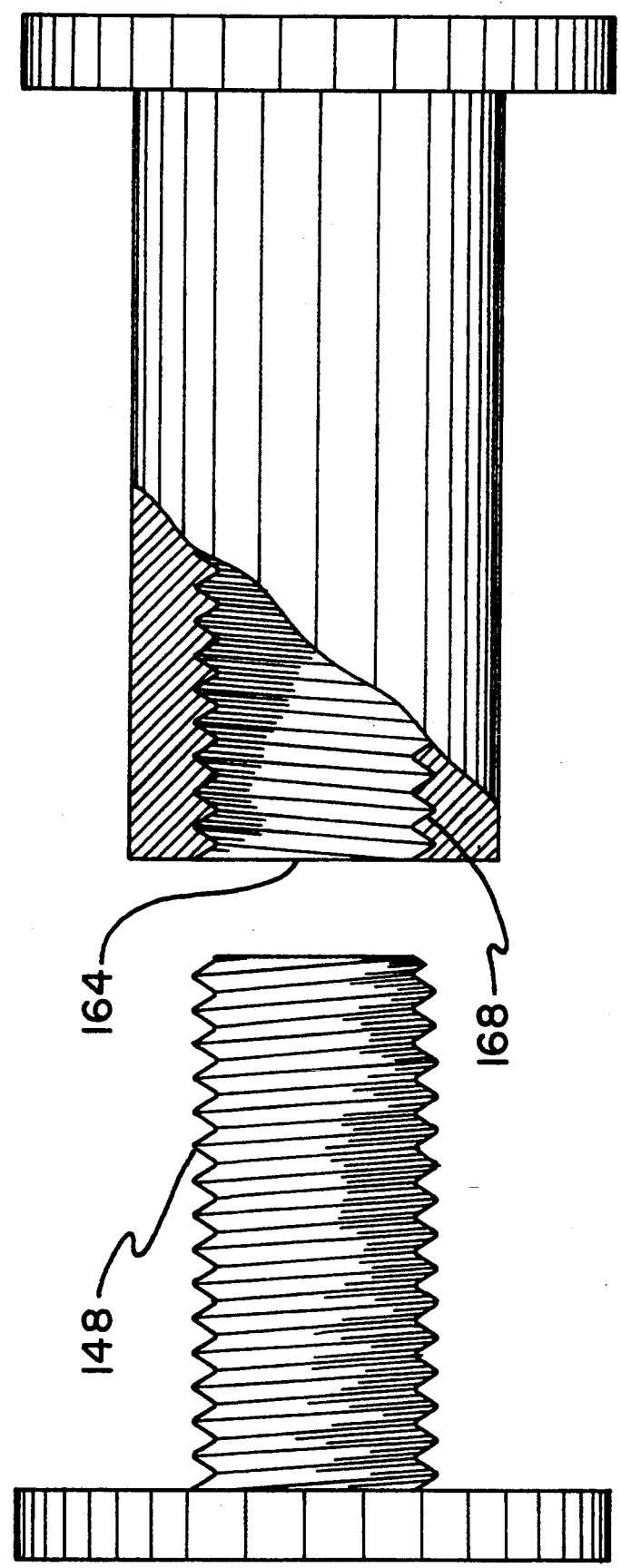
FIG. 3A shows the axle coupled with a nut.
Figure 5:
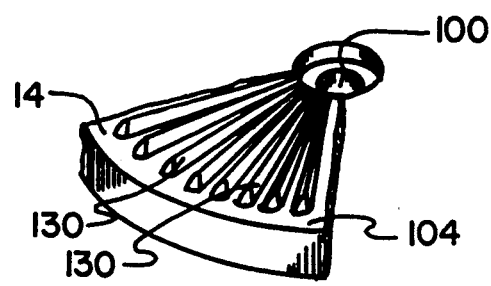
FIG. 5 is an exploded, broken away perspective view of a file wheel illustrating the blades on the inner surface of the file wheel.
Figure 6:
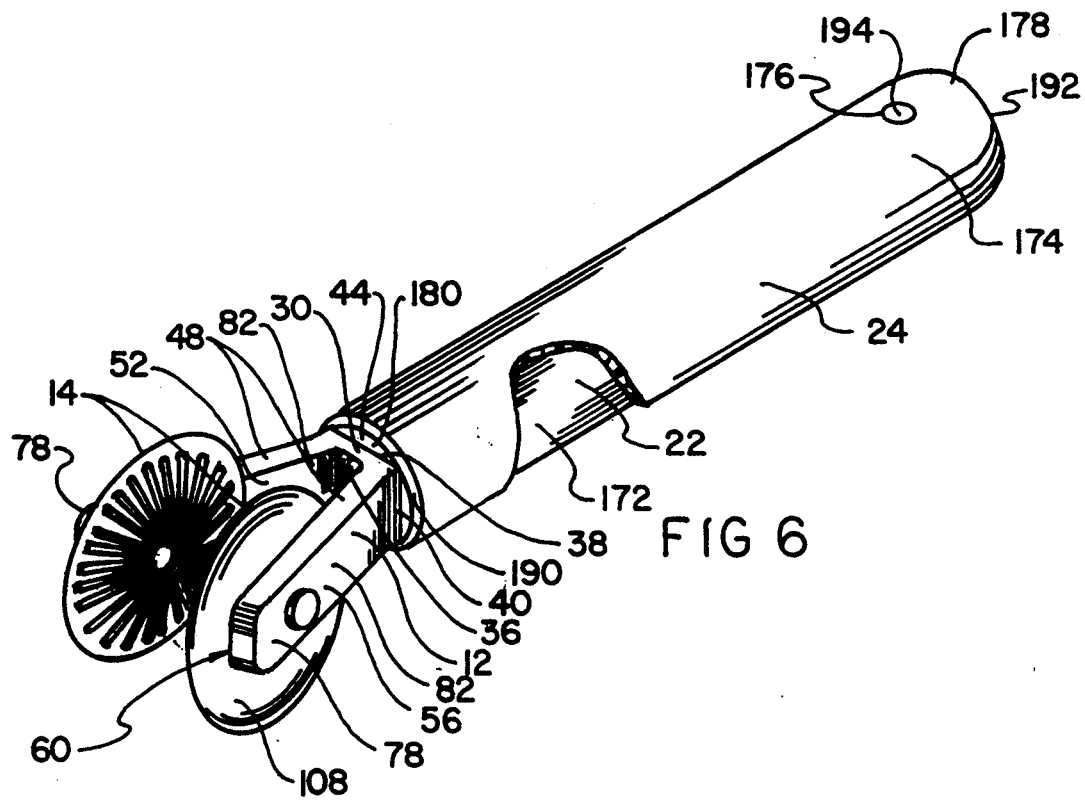
FIG. 6 is a partially broken away perspective view of the sheet metal edging file illustrating the cover on the handle of the apparatus.

With reference now to the drawings, and in particular to FIG. 1 thereof, the preferred embodiment of the new and improved sheet metal edging files embodying the principles and concepts of the present invention and generally designated by the reference numeral 10 will be described.

Specifically, it will be noted in the FIGS. 1 through 6, that there is provided a new and improved sheet metal edging file. The edging file 10, in its broadest context, comprises a frame 12, two file wheels 14, two axles 18, a handle 22, and a handle cover 24.

More specifically, the frame 12 consisting of a base 30 with two side arms 48. The base 30 is formed in a planar, generally rectangular configuration with an upper surface 36, a lower surface 38, parallel short end edges 40 and parallel long side edges 44. The base 30 has upwardly extending side arms 48 which emanate from the upper surface 36 of the opposing short end edges 40. The side arms 48 are formed in a planar, generally rectangular configuration with an inner surface 52, an outer surface 56, parallel short end edges and parallel long side edges. The side arms 48 also have an upper region 78 and a lower region 82. One short end 60 of each side arm 48 is contiguous with the upper surface 36 of the base. The opposing short end of each side arm 48 defines the uppermost extent of the upper region 78 and includes rounded corners 84. The upper region 78 of each side arm 48 also includes a centrally located aperture 90 extending therethrough. The plane of the side arms 48 are angled at between about twenty and forty degrees with respect to the axis of the base 30. The wheels are positioned so that a small space remains between them in the operative orientation.

Two file wheels 14 are each formed in a planar generally circular configuration with a centrally located circular aperture 100 extending therethrough. Each wheel has an inner surface 104 and an outer surface 108. The central portion 112 of each wheel 14 has a thickness larger than the outer edges 116 with a gradually decreasing thickness therebetween. Each wheel 14 includes a plurality of long pyramidal configured blades 130 on its inner surface 104 which extend radially outward from the central aperture 100 to a location proximate to its outer edge 116. The wheels 14 are positioned to oppose each other at an angle of between about forty and sixty degrees when in the operative orientation. When using the apparatus the wheels are positioned around the sides of an edge of a piece of sheet metal.

Two axles 18 are each formed as long cylindrical members 140 with a planar circular head 144 at one end and external screw threads 148 at the other end. The axles 18 are adapted to couple the file wheels 14 to the frame 12 through their respective centrally located circular apertures 100, thereby allowing circular rotation of the wheels 14 upon the axles 18. Two nuts 160 with circular apertures 164 have a plurality of internal screw threads 168 cooperatively coupled with the axles 18 to retain the file wheels 14 thereupon. The axles allow circular rotation of the wheels when drawn along the sharp edge of a piece of sheet metal.

A handle 22 is comprised of metal and formed in a generally cylindrical configuration with an upper section 172 and a lower section 174. The lower section 174 includes a circular aperture 176 which extends through the handle 22 near its lowermost extent 178. The lowermost extent 178 of the lower section 174 is formed in a rounded semi-spherical configuration. The upper section 172 includes a flat surface 180 at its uppermost extent and is operatively coupled to the lower surface 38 of the base 30 of the frame 12. The aperture in the lower section of the handle allows the user to conveniently store the apparatus on a pegboard pin or nail.

A handle cover 24 is comprised of plastic and formed in a hollow, generally cylindrical configuration with one open end 190 and one closed rounded end 192. The cover 24 includes two opposing circular apertures 194 near its rounded end 192. The cover 24 is adapted to receive the handle 22 through its open end 190 with the circular apertures 194 positioned in alignment with the circular aperture 176 in the handle 22. The cover 24 is configured to fit securely around the handle 22 to enhance gripping by the user. The texture of the handle cover provides the user with a secure and comfortable gripping surface when utilizing the apparatus.

The sheet metal edging file is a tool which serves to dull the sharp edges on pieces of sheet metal. Sharp edges on such material may cause injuries and make handling of the material difficult. With the sheet metal edging file, this problem can be corrected quickly and easily.

The sheet metal edging file includes a long handle surrounded by a plastic cover to enable the user to grip it securely. The handle has a small aperture near its lower end to allow storage on a pegboard pin or nail. The main part of the tool consists of a set of two arms that broaden into a Y shape configuration. A file wheel is mounted on the inner side of each fork of the Y in such a way that the two file wheels face each other on an angle. The wheels are positioned so that a gradually increasing gap exists between them.

To operate the apparatus the user simply draws the tool back and forth along the sharp edges of a piece of sheet metal so that the edges make contact with the blades on the file wheels. This results in removal of burrs and grinding of edges to the point where they are dull enough to be handled safely. Companies with workers who handle sheet metal should be interested in using the sheet metal edging file.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved sheet metal edging file comprising, in combination:

a frame consisting of a base and two side arms, the base being formed in a planar generally rectangular configuration with an upper surface and a lower surface and parallel short end edges and parallel long side edges, said side arms extending upwardly and emanating from the upper surface of the opposing short end edges, said side arms being formed in a planar generally rectangular configuration with an inner surface and an outer surface and parallel short end edges and parallel long side edges, said side arms also having an upper region and a lower region, with one short end edge of each side arm being contiguous with the upper surface of the base, with the opposing short end edge of each side arm defining the uppermost extent of the upper region and including rounded corners, the upper region of each side arm also including a centrally located aperture extending therethrough, the plane of said side arms being angled at between about twenty and forty degrees with respect to the axis of the base;

two file wheels, each wheel being formed in a planar generally circular configuration with a centrally located circular aperture extending therethrough, each wheel having an inner surface and an outer surface, with the central portion of each wheel having a thickness larger than the outer edge of each wheel with a gradually decreasing thickness therebetween, each wheel including a plurality of long pyramidal configured blades on its inner surface extending radially outward from its central aperture to a location proximate to its outer edge, the wheels being positioned to oppose each other at an angle of between about forty and sixty degrees when in the operative orientation;

two axles, each axle being formed as a long cylindrical member with a planar circular head at one end and external screw threads at the other end, the axles adapted to couple the file wheels to the frame through their respective centrally located circular apertures allowing circular rotation of the wheels upon the axles, two nuts with circular apertures having a plurality of internal screw threads cooperatively couple with the axles retaining the file wheel thereupon;

a handle comprised of metal and formed in a generally cylindrical configuration with an upper section and a lower section, the lower section including a circular aperture extending through the handle near its lowermost extent, the lowermost extent of the lower section being formed in a rounded semispherical configuration, with the upper section including a flat surface at its uppermost extent, with the flat surface on the upper section being operatively coupled to the lower surface of the base of the frame; and a handle cover comprised of plastic and formed in a hollow generally cylindrical configuration with one open end and one closed rounded end, the cover including two opposing circular apertures near its rounded end, the cover being adapted to receive the handle through its open end with its circular apertures positioned in alignment with the circular aperture in the handle, the plastic cover being configured to fit securely around the handle to enhance gripping by a user.

2. A sheet metal edging file comprising:

a frame consisting of a base with two side arms extending upwardly, the side arms being formed in a generally planar configuration with an inner surface and an outer surface and parallel short end edges and parallel long side edges, the side arms also having an upper region and a lower region, with one short end edge of each side arm being contiguous with the upper region of the base, the upper region of each side arm also including a centrally located aperture extending therethrough, the plane of the side arms being angled at an acute angle with respect to the axis of the base;

two file wheels, each wheel being formed in a planar generally circular configuration with a centrally located circular aperture extending therethrough, each wheel having an inner surface and an outer surface, each wheel including a plurality of blades on its inner surface extending radially outward from its central aperture to a location proximate to its outer edge, the wheels being positioned to oppose each other at an acute angle;

two axles, each axle being formed as a long cylindrical member, the axles adapted to couple the file wheels to the frame through their respective centrally located circular apertures; and a handle formed in a generally cylindrical configuration with an upper section coupled to the frame and a lower section for being gripped by a user.

3. The sheet metal edging file as set forth in claim 2 and further including:

a handle cover formed in a hollow generally cylindrical configuration with one open end and one closed rounded end, the cover being fashioned to fit securely around the handle to enhance gripping by the user.

4. The sheet metal edging file as set forth in claim 3 wherein the lower extent of the handle and handle cover includes a centrally located aperture extending therethrough to permit suspension.

* * * * *